(12) United States Patent
Kurokawa (10) Patent No.: US 6,899,542 B2
(45) Date of Patent: May 31, 2005

(54) METHOD AND SYSTEM FOR MEASURING MEMORY AND LEARNING CAPABILITIES

(76) Inventor: Mamoru Kurokawa, 15-3-302, Nakazono, Nagasaki-shi, Nagasaki (JP), 825-8155

( * ) Notice: Subject to any disclaimer, the term of this patent is extended or adjusted under 35 U.S.C. 154(b) by 0 days.

(21) Appl. No.: 10/726,530

(22) Filed: Dec. 4, 2003

(65) Prior Publication Data

US 2004/0142313 A1 Jul. 22, 2004

Related U.S. Application Data

(62) Division of application No. 10/075,247, filed on Feb. 15, 2002, now abandoned.

(30) Foreign Application Priority Data

May 23, 2001 (JP) ........................................ 2001-154668

(51) Int. Cl.[7] ............................................. G09B 19/00
(52) U.S. Cl. ...................... 434/236; 119/421; 119/51.01
(58) Field of Search ........................... 434/236; 119/60, 119/421, 51.01, 416, 417

(56) References Cited

U.S. PATENT DOCUMENTS

| | | | |
|---|---|---|---|
| 3,304,911 A | 2/1967 | Hakata et al. | |
| 3,494,329 A | 2/1970 | Frieberger | |
| 3,540,413 A | 11/1970 | Castaigue | |
| 3,566,844 A | 3/1971 | Occhiodori et al. | |
| 3,974,798 A | 8/1976 | Meetze, Jr. | |
| 4,337,726 A | 7/1982 | Czekajewski et al. | |
| 4,574,734 A | 3/1986 | Mandalaywala et al. | |
| 4,981,106 A | 1/1991 | Nagatomo | |
| 5,247,901 A | 9/1993 | Landon et al. | |
| 5,474,024 A | 12/1995 | Hallock | |
| 5,513,596 A | 5/1996 | Coiro et al. | |
| 5,608,209 A | 3/1997 | Matsuda | |
| 5,717,202 A | 2/1998 | Matsuda | |
| 5,765,506 A | 6/1998 | Hawk et al. | |
| 5,915,332 A | 6/1999 | Young et al. | |
| 6,082,304 A | 7/2000 | Crainl | |
| 6,234,111 B1 | 5/2001 | Ulman et al. | |
| 6,311,644 B1 | 11/2001 | Pugh | |
| 6,542,850 B2 | 4/2003 | Ulman et al. | |
| 2002/0115725 A1 | 8/2002 | Epstein et al. | |
| 2003/0100998 A2 * | 5/2003 | Brunner et al. | ............... 702/19 |
| 2003/0119884 A1 | 6/2003 | Epstein et al. | |

FOREIGN PATENT DOCUMENTS

| | | |
|---|---|---|
| EP | 0 363 755 A2 | 4/1990 |
| EP | 0 505 049 A1 | 9/1992 |
| FR | 2 622 393 A1 | 5/1989 |
| GB | 2 037 140 A | 7/1980 |

OTHER PUBLICATIONS

Ticher et al., "Detection of Rodents Activity Rhythm Fine Structure by a Simple Time Series Monitor", 1994, Biological Rhtym Research, vol. 25, No. 4, pp. 442–450.*

Gannon et al., "A System for Studying the Microstructure of Ingestive Behavior in Mice", 1992, Physiology & Behavior, vol. 51, pp. 515–521.*

Gaffan et al., "A computer–controlled maze environment for testing visual memory in the rat", 1995, Journal of Neuroscience Methods, vol. 60, pp. 23–27.*

* cited by examiner

*Primary Examiner*—Chanda L. Harris
(74) *Attorney, Agent, or Firm*—Antonelli, Terry, Stout & Kraus, LLP (57) ABSTRACT

A method of measuring memory and learning capabilities of a small animal provided with measuring successively a position of the small animal in an observation field with an infrared ray detector, while a computer controls opening of a plurality of covers, provided between the observation field holding the small animal therein and a feed holder storing feed therein, in a predetermined order each for a unit period. Further, the number of accessing times of the small animal to respective through holes formed on the observation field, which is opened/closed with the covers, during each unit period, is calculated by the computer, on the basis of an output from the infrared ray detector, in which each of the through holes is provided with an escape preventing net having hole of a diameter smaller than a diameter of a scull of the small animal.

2 Claims, 8 Drawing Sheets

(TIME)

FIG.8

(TIME)

- ◆— NUMBER OF VISITS TO CLOSED FEED STATIONS OVER NUMBER OF VISITS TO PREVIOUSLY OPENED FEED STATIONS (%)
- ■— CORRECT RESPONSE RATE (%)

- ◆— CORRECT RESPONSE RATE (%)
- ■— NUMBER OF SEARCHING VISITS (TIMES)
- ○— NUMBER OF CORRECT VISITS (TIMES)

METHOD AND SYSTEM FOR MEASURING MEMORY AND LEARNING CAPABILITIES

CROSS REFERENCE TO RELATED APPLICATION

This is a divisional of U.S. application Ser. No. 10/075,247, filed Feb. 15, 2002, now abandoned, the subject matter of which is incorporated by reference herein.

BACKGROUND OF THE INVENTION

This invention relates to techniques in the region of behavioral science in the medical physiological field, and more particularly to a method of and a system for measuring the memory and learning capabilities of small animals by utilizing the natural ingestion and/or drinking appetite of such animals.

To measure the memory and learning functions of small animals, for example, a Morris's water maze, a cowering reaction of small animals against an electric shock, an elevated maze, a radial arm maze and the like are utilized. According to the techniques utilizing these techniques, it is necessary that an experimenter transfers animals from a breeding cage to a specially provided experimental environment and conducts experiments in a light period (at an inactive phase of animals) in which the experimenter can observe the animals with the naked eye. To conduct experiments, the experimenter usually touches the animals so as to fasten them but touching the animals causes stresses on them in some cases due to the physical stimulus attended with the touching action. This results in occurrence of a scatter in the results of the experiments.

SUMMARY OF THE INVENTION

An object of the present invention is to provide a system for measuring the memory and learning capabilities of a subject animal by utilizing the unaffected ingestion and/or drinking appetite thereof, capable of reducing the influence exerted by an experimenter, upon the results of the experiments. Further, the invention enables measuring the memory and learning capabilities of nocturnal animals by utilizing the unaffected ingestion and/or drinking appetite thereof even at an active phase (dark period) thereof.

(1) The present invention provides a system for measuring the memory and learning capabilities of a small animal, including:

a feed holder in which feed to be given to the small animal is stored, an observation field having a plurality of through holes opened into the feed holder, and holding therein the small animal, openable covers adapted to open and close the respective through holes, and having a ventilating function, a dark chamber joined to the observation field, an observation unit to measure the positions of the small animals in the observation field successively by using infrared rays, and a computer to control opening and closing timing of the openable covers and calculate the number of access during each unit time of the small animals to the respective through holes on the basis of an output from the observation unit.

(2) The present invention also provides a system for measuring the memory and learning capabilities of a small animal, including:

an observation field holding the small animal therein, a dark chamber joined to the observation field, a water supply unit having a plurality of nozzles inserted into the observation field, and adapted to supply water, which is to be given to the small animal to the nozzles, an observation unit adapted to measure the positions of the small animal successively by using infrared rays, and a computer for controlling timing of supplying water to the respective nozzles, and calculating the number of accessing times, during each unit time, of the small animal to the nozzles on the basis of an output from the observation unit.

DESCRIPTION OF THE PREFERRED EMBODIMENTS

An embodiment of the present invention will now be described with reference to the attached drawings.

First, the configuration of this embodiment of the measuring system will be described with reference to FIG. 1 to FIG. 5.

Figure 1:
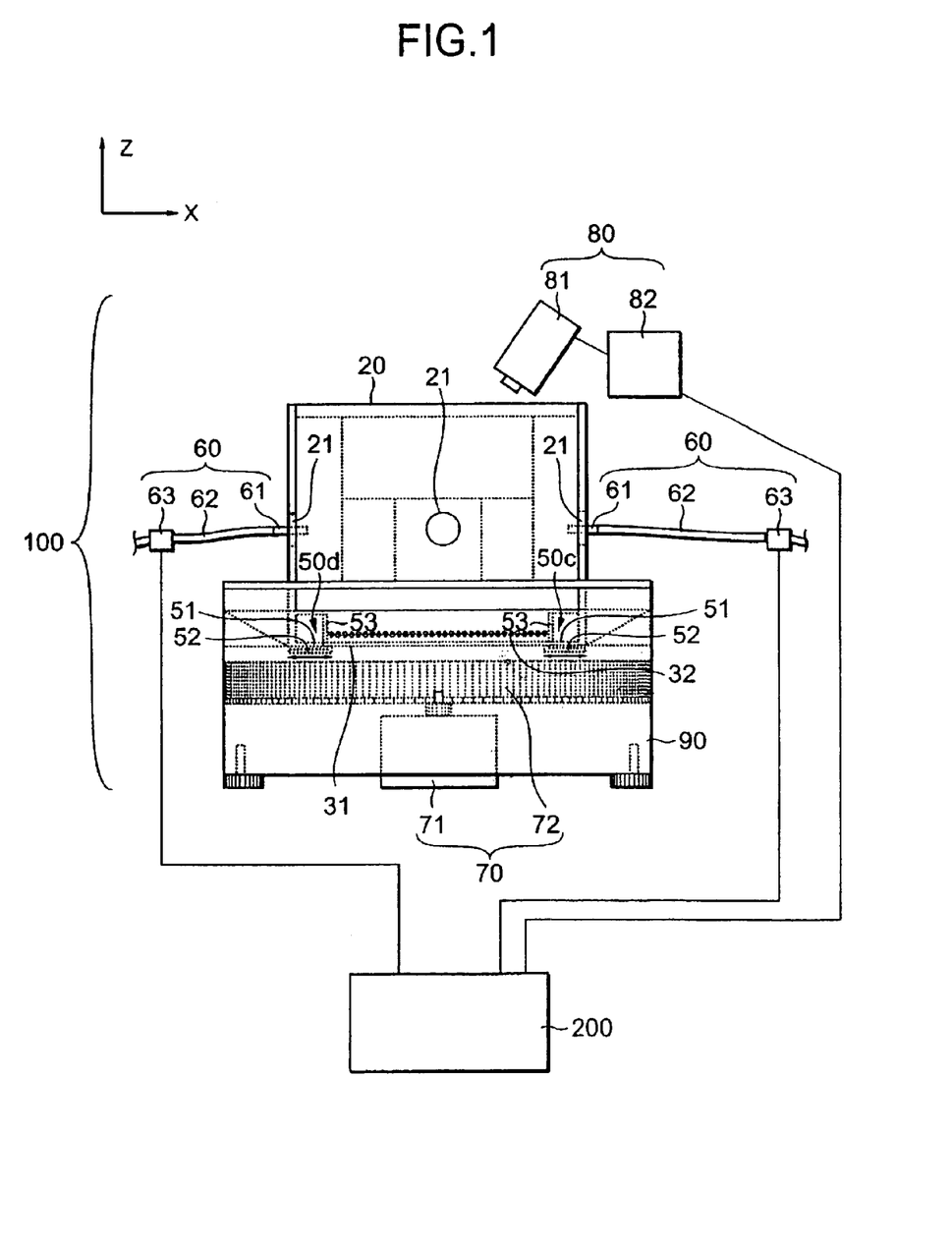
FIG. 1 is a schematic construction diagram illustrating a measuring system according an embodiment of to the present invention.
Figure 2:
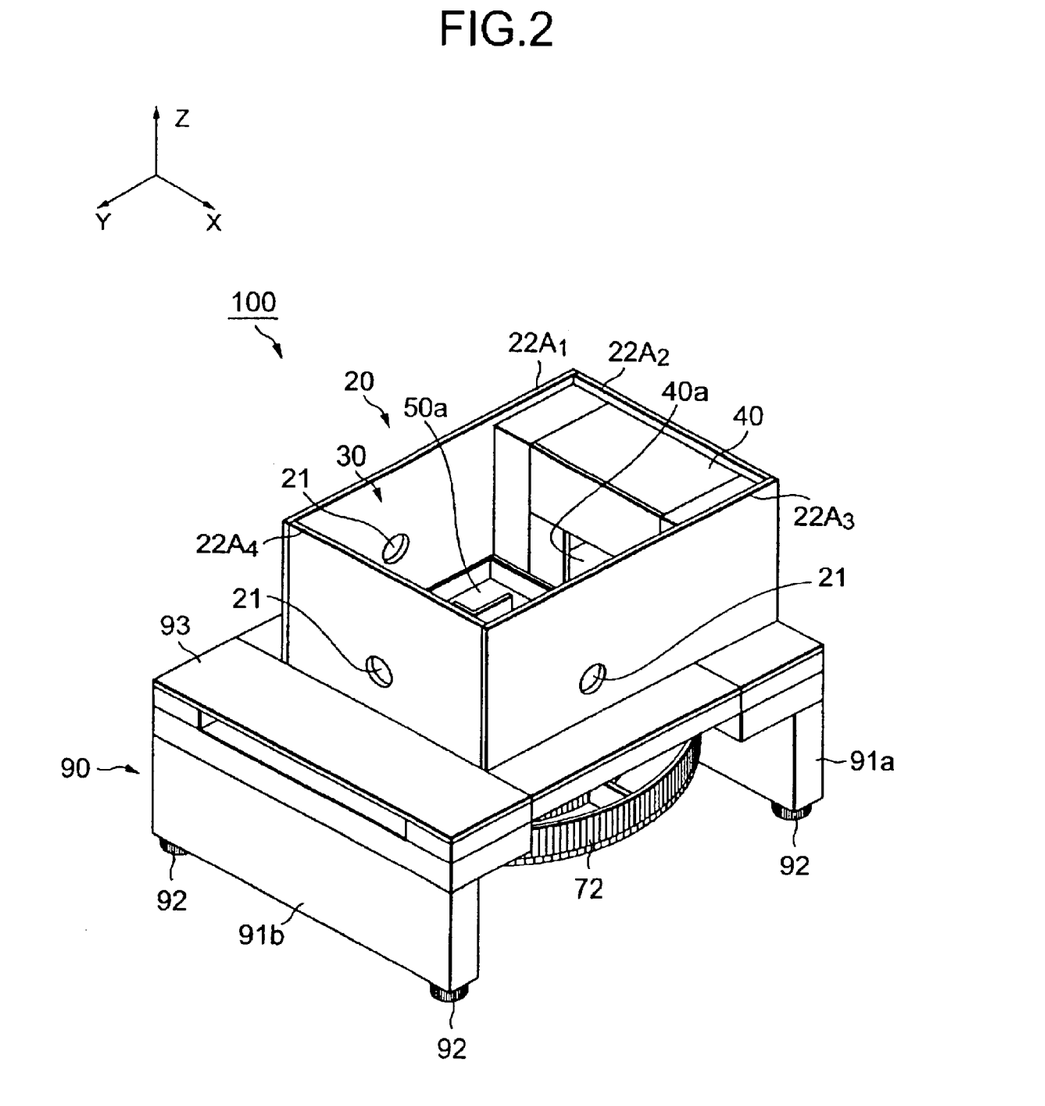
FIG. 2 is a perspective view of a measuring unit according to an embodiment of the present invention.
Figure 3:
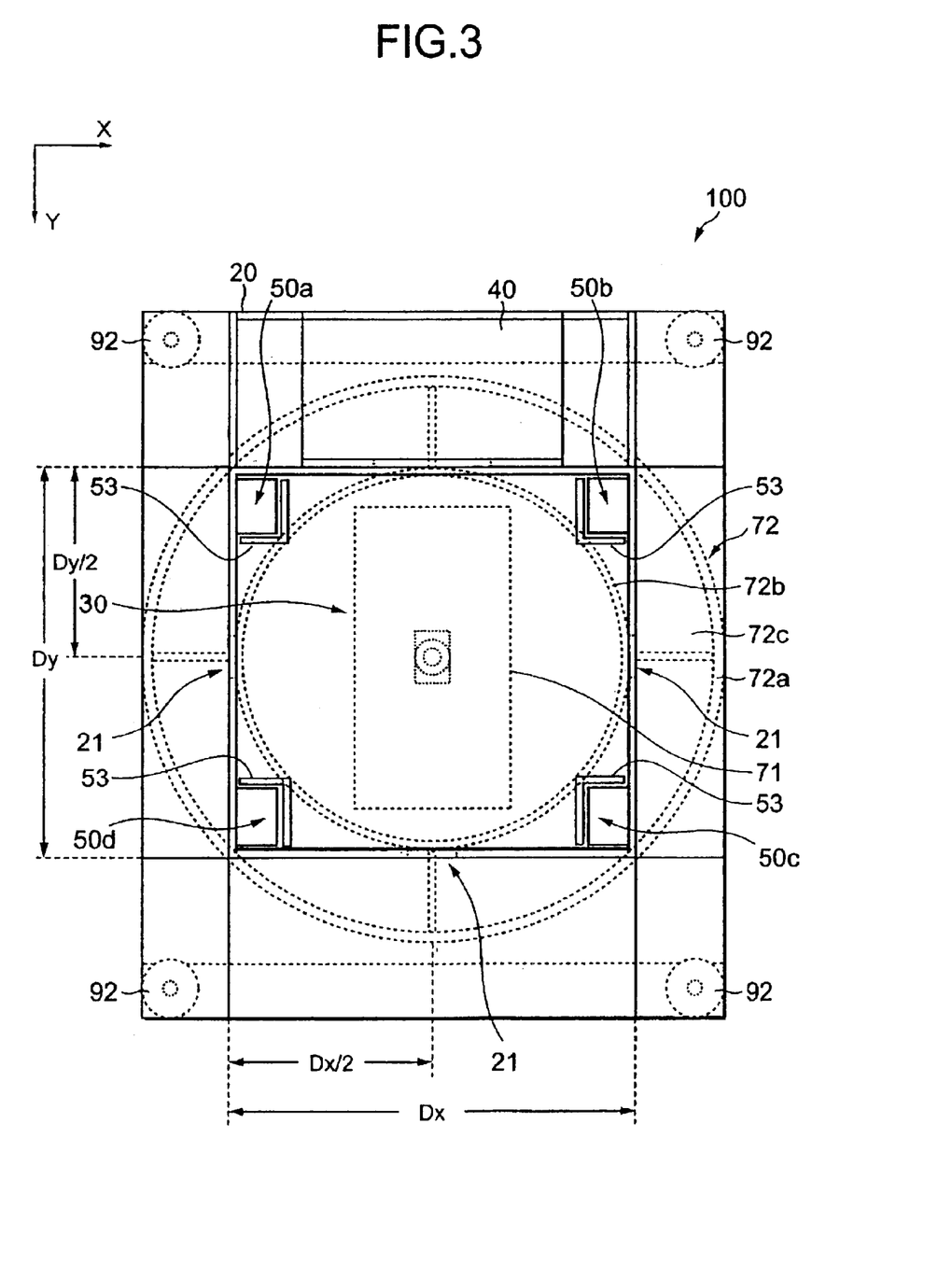
FIG. 3 is a plan view of the measuring unit according to an embodiment of the present invention.

FIG. 1 is a schematic general construction diagram showing one embodiment of the measuring system, and FIG. 2 and FIG. 3 a perspective view and a plan view of a measuring unit included in the embodiment of the measuring system. In each of the drawings, a rectangular coordinate system having as an X-Y plane a horizontal plane on which the measuring unit is set, is defined for the convenience of giving the following description.

As shown in FIG. 1, this measuring system has a measuring unit 100 to make measurement concerning a small animal (rats, mice and the like), and a computer (personal computer) 200 to control the measuring unit 100 and analyze the behaviors of the small animal on the basis of the results of the measurement conducted by the measuring unit 100.

The measuring unit 100 has as shown in FIG. 1, FIG. 2 and FIG. 3, a residence box 20 housing therein the small animal, a subject of the experiment, a water supply unit 60 provided in the residence box 20 so as to supply drinking water to the small animal, a rotary feeder 70 for storing feed, such as powdered feed and the like, which are to be given to the small animals, in the residence box 20, a support base 90 for positioning the residence box 20 on the rotary feeder 70, and an observation unit 80 for tracing the movements of the small animals in a predetermined region in the residence box 20. The details of each portion of the measuring unit 100 are as follows.

As shown in FIG. 2 and FIG. 3, the residence box 20 is provided in the interior thereof with an observation field 30 in which the condition of the animals is observed by an observation unit 80, and a dark resting chamber (which will hereinafter be referred to as a nest) 40 narrower than the observation field 30.

As shown in FIG. 2, the nest 40 is provided so as to contact the whole of an inner surface of one side-wall-member $22A_2$ out of four side wall members $22A_1$, $22A_2$, $22A_3$, $22A_4$ which constitute the residence box 20, and has a gate 40a facing the observation field 30.

The observation field 30 is provided so as to be positioned in a substantially central portion of the measuring unit 100. Although the observation field 30 may have any shape, the observation field in this embodiment has a square shape in horizontal section. The floor of this observation field 30 has a double structure as shown in FIG. 1 which is formed by a stainless steel screen 31 of such meshes that do not permit the feet of the small animals to be sunken into the eyes of the screen, and a detachable plate member 32 provided under the stainless steel screen 31. The feces and urine excreted by the small animals in the observation field fall from the eyes of the stainless steel screen 31 and are collected on the detachable plate type member 32. This prevents the interior of the observation field 30 from being soiled with the feces and urine.

In each corner of the floor of the observation field 30, feed stations 50a, 50b, 50c, 50d for use in giving feed stored on the rotary feeder 70 to the small animals are provided as shown in FIG. 3. To be concrete, a feeding through hole 51 facing a surface of the feed on the rotary feeder 70 is made open in each corner of the floor of the observation field 30 as shown in FIG. 1, and escape preventing metal nets (not shown) having two holes of a diameter (around 15 mm in case where the small animal is a mouse) slightly smaller than that of a scull of the small animal are respectively spread over these feeding through holes 51. The small animal in the observation field 30 can eat the feed on the rotary feeder 70 by inserting their snouts, for example, through holes for feeding through the mesh of the escape preventing metal nets. Each of the four feed stations 50a, 50b, 50c, 50d is provided with an openable cover 52 for closing and opening the feeding through holes 51, and two fence-like frames 53 standing up on the floor so as to separate the feeding through holes 51 from a region of the stainless steel screen 31. In this embodiment, for example, a slide shutter reciprocatingly movable in an X-axis direction under the escape preventing stainless steel screen 31 can be used as the openable cover 52. Although the openable cover 52 is provided so as to control the time for feeding the small animal, the openable cover is formed of a material having ventilation properties, for example, mesh or a lattice so that the smell of the feed on the rotary feeder 70 reaches the interior of the observation field 30 even when the feeding through holes 51 are closed. The fence-like frames 53 are provided so as to prevent the powdered feed and the like from scattering in the interior of the observation field 30, and the feces and urine of the animal from being mixed in the feed on the rotary feeder 70.

However, it is necessary that the fence-like frames 53 be formed in such a height that the small animal can bring its head from the outside of the fence-like frames 53 to the feeding through holes 51 on the inner side of the fence-like frames 53.

As shown in FIG. 2 and FIG. 3, among the side-wall-members $22A_1$, $22A_2$, $22A_3$, and $22A_4$ constituting the residence box 20, the three side-wall-members $22A_1$, $22A_3$, and $22A_4$ facing the interior of the observation field 30 each have a through hole 21 for water supply formed at a height h which the small animal on the stainless steel screen 31 can reach with its snout. It is preferable that the water supply through holes 21 are each formed at a position of a half width, $D_X/2$ of a width $D_X$ with respect to the X-direction of the observation field 30 and at a position of a half width, $D_Y/2$ of a width $D_Y$ with respect to the Y-direction.

When the small animal housed in the residence box 20 having the above construction, takes feed or drink water, such small animal stays in the observation field 30. When the small animal neither takes, feed nor drink water, such small animal stays in the shaded nest 40.

As shown in FIG. 1, water supply units 60 each have a hose 62 formed of silicon tube or the like with a diameter of about 2 mm, a water supply tank (not shown) joined to one end of the hose 62 via a connector, a water supply nozzle 61 fixed to the other end of the hose 62, and an electromagnetic valve 63 provided in the hose 62. The water supply tank is provided at a position higher than the three water supply through holes 21 of the residence box 20. The three water supply nozzles 61 are each inserted through the three feed water through holes 21 of the residence box 20 into the observation field 30, and fixed to the water supply through hole 21 by a metal member (not shown). Each of the water supply nozzles 61 used in this embodiment opens a nozzle port when a force is applied from the outside to a free end thereof, and closes the nozzle port when the applied force to the free end is removed. According to such a water supply unit 60, when a small animal makes a contacting action against the free end of the water supply nozzle 61, in other words, when a small animal pushes the free end of the water supply nozzle 61 with its nose, mouth, etc., in a water supply time zone during which the electromagnetic valve 63 is opened, the water is discharged from the water tank through the nozzle port of the water supply nozzle 61 via the hose 62.

Figure 5:
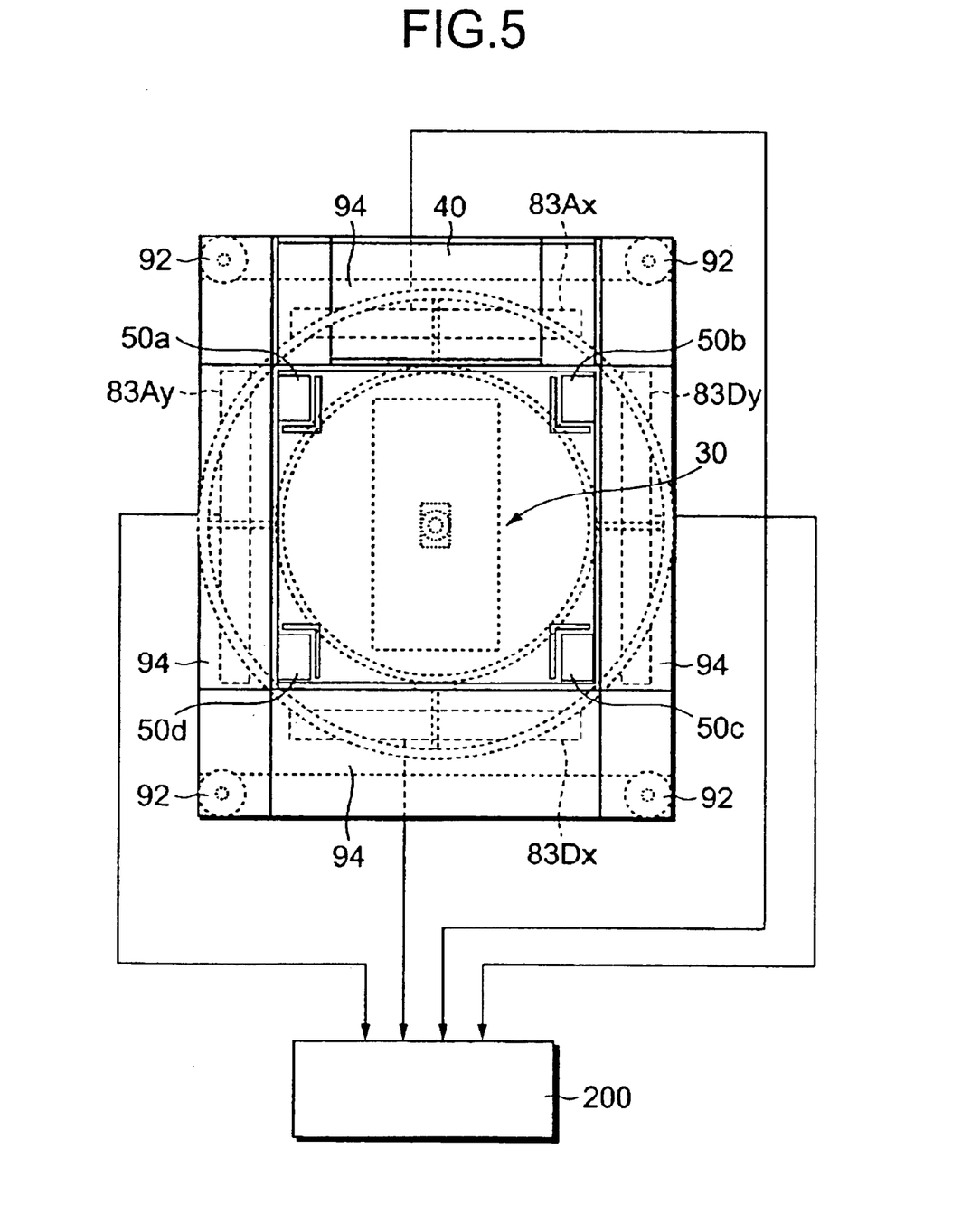
FIG. 5 is a schematic construction diagram illustrating the measuring system according to an embodiment of the present invention.

As shown in FIG. 1 and FIG. 3, the rotary feeder 70 has a disk type feed holder 72 provided so that the axis of the disk type feed holder extends along a Z-axis, and a motor 71 for turning the feed holder 72 around the Z-axis. On the inner side of the feed holder 72, an inner annular wall 72b is formed along an outer wall 72a as shown in FIG. 5. The feed for the small animals is stored in a belt-like region 72c formed between the outer wall 72a and inner wall 72b. In order that the small animals in the observation field 30 can eat the feed via the feeding through holes 51 of the feed stations 50a, 50b, 50c, 50d, this belt-like region 72c passes lower portions of the four feed stations 50a, 50b, 50c, 50d by the rotation of the motor 71. Namely, since the feed stations 50a, 50b, 50c, 50d are provided at the corners of the square observation field 30 in this embodiment, the feed holder 72 having the outer wall 72a the inner diameter of which is substantially equal to the length of a diagonal line of the observation field 30, and the inner wall 72b the inner diameter of which is substantially equal to a distance between the feed stations which are in diagonally opposite positions is provided so that a rotary shaft of the feed holder passes an intersection of the diagonal lines of the observation field 30.

According to such a rotary feeder 70, the positions of the feed stations 50a, 50b, 50c, 50d with respect to the surface of the feed in the belt-like region 72c can be changed by turning the feed holder 72. This can prevent the surface of the feed in the feed holder 72 from being partially recessed due to the ingestion of the feed by the small animals. Therefore, it can prevent the occurrence of a region, in which the small animals have difficulty in eating the feed, on the surface of the feed in the feed holder 72.

The support base 90 has a top plate 93 on which the residence box 20 is fixed, two plate type support legs 91a, 91b, for supporting both ends of the top plate 93 and height adjusting caps 92 fixed to lower ends of the two plate type support legs 91a, 91b. By this support base 90, the residence box 20 is held on an upper portion of the rotary feeder 70.

As shown in FIG. 1, the observation unit 80 has an infrared motion picture camera 81 while enables shooting even in a dark period, a behavioral period of the small animal, and a processor 82 for calculating a barycentric position of an image of the small animal taken as shielding bodies by the infrared motion picture camera 81. The infrared motion picture camera 81 is provided at an upper part of the observation field 30 so that a lens thereof faces the interior of the observation field 30. The processor 82 calculates a barycentric position of an image of the small animal at suitable time intervals (for example, at intervals of 0.5 seconds or 1 second), and output the results of the calculation successively to an output unit (printer) and a computer 200.

Figure 4:
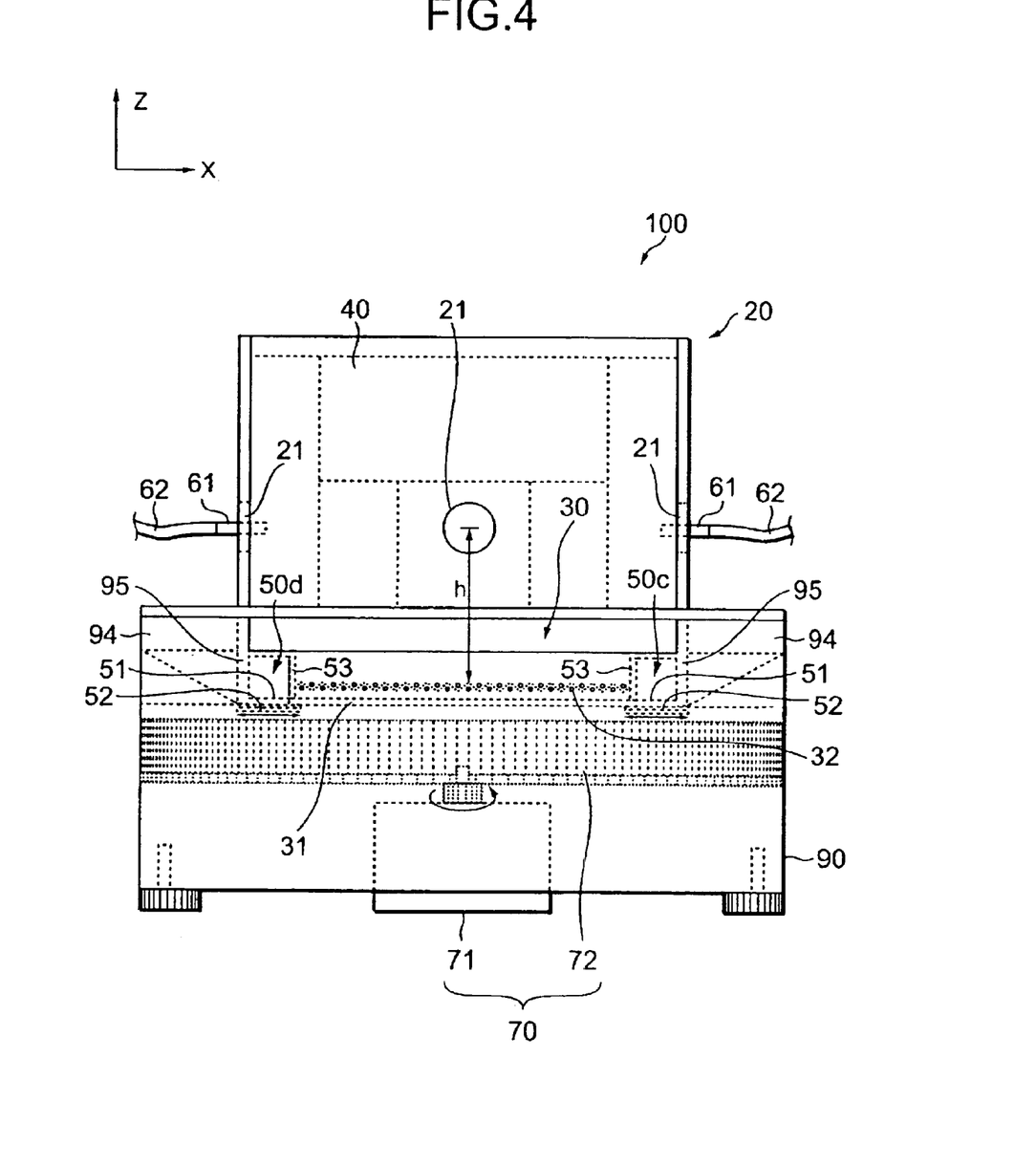
FIG. 4 is a front view of the measuring unit according to an embodiment of the present invention.

Although the observation unit 80 having the infrared motion picture camera 81 is used in this embodiment, a position detector having an infrared ray detector other than the infrared motion picture camera 81 may also be used. For example, an infrared ray sensor including an infrared projector and an infrared ray receiver may be used instead of the infrared motion picture camera 81. When the infrared ray sensor is used, it is necessary to provide the floor of the nest 40 at a position which is higher than that of the observation field 30, and to form sensor set chambers 94 so as to enclose four sides of a space in the vicinity of the stainless steel screen 32 of the observation field 30 as shown in FIG. 4 and FIG. 5. It is necessary to provide a transparent glass window 95 between sensor set chambers 94 and the observation field 30. Paired infrared ray projector $83A_x$ and infrared ray receiver $83D_x$ opposed to each other with respect to the Y-direction and paired infrared ray projector $83A_y$ and infrared ray receiver $83D_y$ opposed to each other with respect to the X-direction are provided in the interior of the sensor set chamber 94. One paired infrared ray projector $83A_x$ and infrared ray receiver $83D_x$ are used to detect the X-coordinates of the small animals in the observation field 30, while the other paired infrared ray projector $83A_y$ and infrared ray receiver $83D_y$ are used to detect the Y-coordinates of the small animals in the observation field 30.

The computer 200 not only controls the opening and closing of the openable covers 52, the opening and closing of the electromagnetic valves 63 and the rotation of the motor 71 in accordance with a program executed thereby, but also analyzes an output from the position detector. By the processing operation of the computer 200, the memory and learning capabilities of the small animal are measured. A method of measuring the memory and learning capabilities of the small animal utilizing this mode of embodiment of the measuring system inclusive of a process executed by the computer 200 will now be described with reference to FIG. 6. Inside the residence box 20 of the measuring unit 100, the small animal, a subject of the measurement of memory and learning capabilities thereof shall be held in advance.

Figure 6:
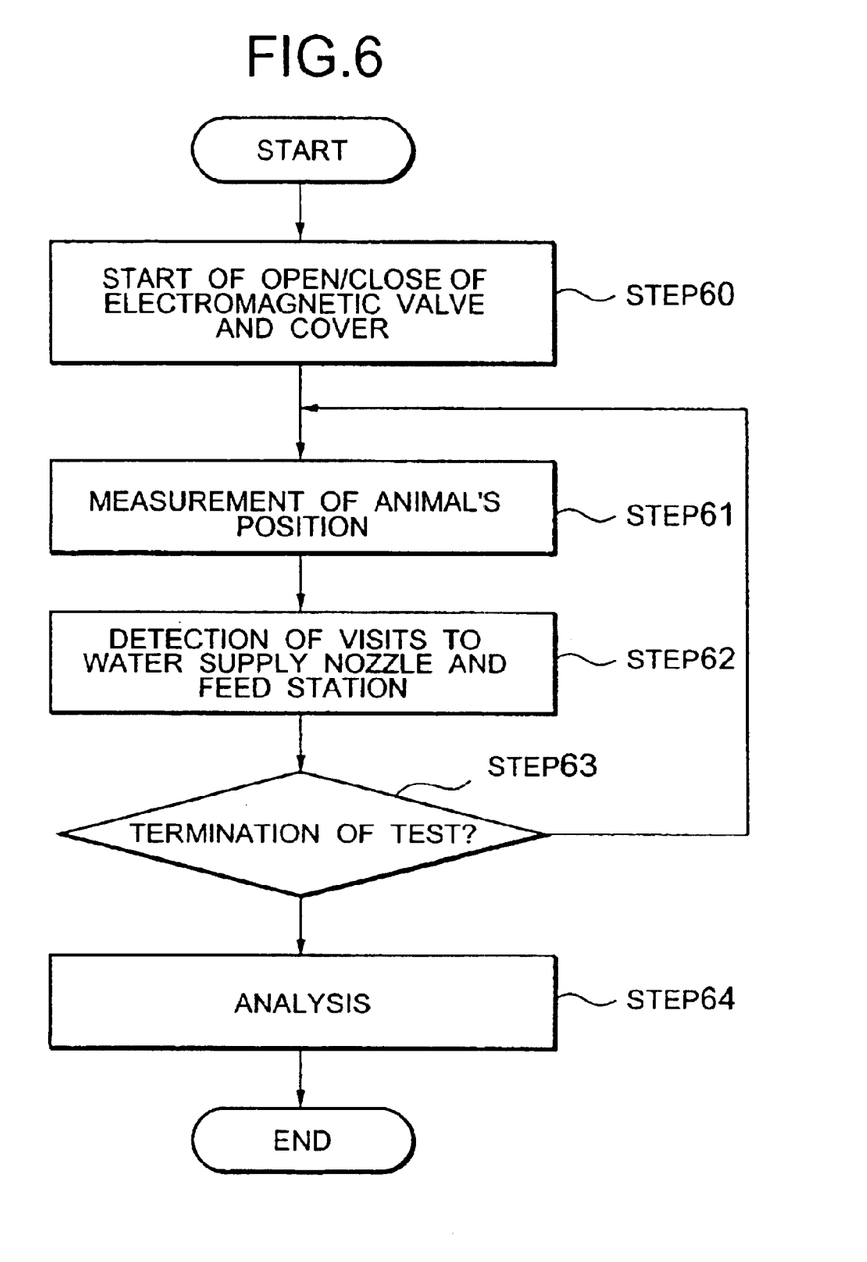
FIG. 6 is a flow chart of a process carried out by the measuring system according to an embodiment of the present invention.

The computer 200 drives the motor 71 so that the feed holder 72 can be turned intermittently by predetermined angles (for example, 22.5° at intervals of 1 hour) at predetermined time intervals. The computer 200 opens the three electromagnetic valves 63 one by one in order at predetermined time intervals so that only any one of the three electromagnetic valves 63 can be always opened. The computer 200 also opens the four openable covers 52 one by one in order at predetermined time intervals so that only any one of the four openable covers 52 can be always opened. As a result, out of the plural feed water nozzles 61 and plural feed stations 50a, 50b, 50c, 50d, the feed water nozzle from which the small animals can obtain the water and the feed station from which the small animals can obtain the feed come to change sequentially as the feed holder 72 is turned (Step 60).

The observation unit 80 calculates successively the coordinates (X, Y) of the positions of the small animal placed under such a circumstance, and successively outputs the results of calculation to the computer 200 (Step 61).

The computer 200 detects based on an output from the observation unit 80, the number of visits of the small animal to each feed water nozzle and the number of visits of the small animal to each feed station (Step 62). To be concrete, when the coordinates which the observation unit 80 successively outputs continue to indicate for a predetermined period of time (for example, 2 seconds) a position in an ambit region of any feed water nozzle, the computer 200 counts this condition as one visit of the small animal to the relative feed water nozzle, and retains the counted value along with the time at which the counted value is obtained. When the coordinates which the observation unit 80 successively outputs continue to indicate for a predetermined period of time (for example, 4 seconds) a position in an ambit region of any feed station, the computer 200 also counts this condition as one visit of the small animal to the relative feed station, and retains the counted value along with the time at which the counted value is obtained. Hereinbefore, the ambit regions of each water supply nozzle and that of each feed station are predetermined as regions of interest around each water supply nozzle and each feed station.

During such measurement period, the computer 200 judges whether a predetermined period of experiment time (for example, 7 days) has passed or not (S63). When the results of judgment show that experiment time has passed, the computer 200 analyzes the data obtained as the results of the operations repeatedly carried out in S62, and outputs the results of the analysis (S64). Out of these results of analysis, concrete examples of the above analytical results concerning the feeding behaviors of the small animal are shown in FIG. 7, FIG. 8 and FIGS. 9A and 9B.

Figure 7:
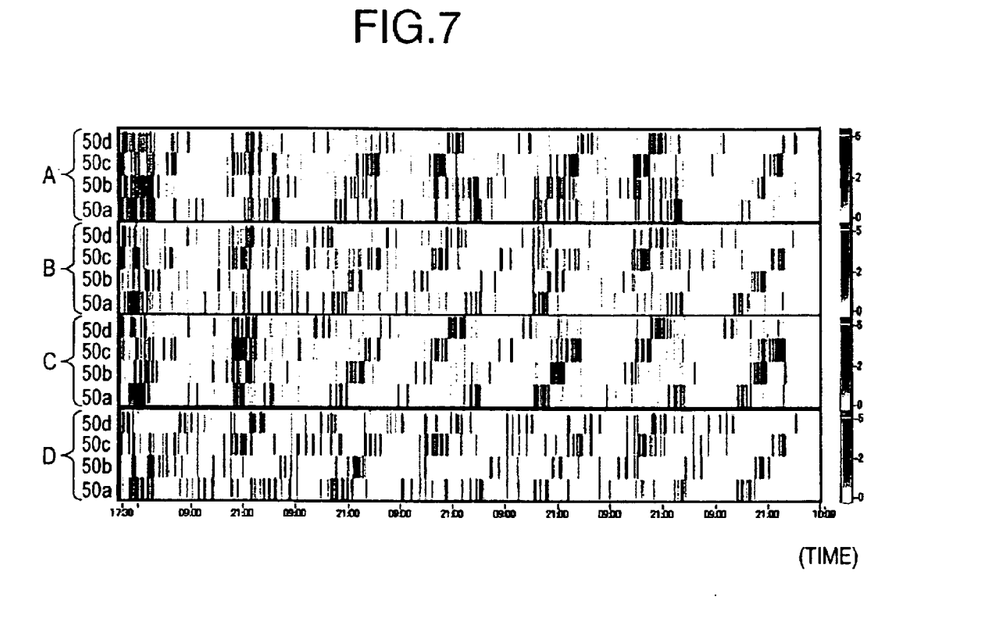
FIG. 7 is a time chart showing behavioral patterns of normal mice outputted from the measuring system according to an embodiment of the present invention.

FIG. 7 is a time chart showing behavioral patterns of four normal mice A, B, C, and D in a case where the feed available station is shifted in the order of from 50a, 50b, 50c, to 50d at unit time intervals (in this embodiment, at 1 hour intervals). The lapse of time from the experiment starting time is taken along the lateral axis, and each time zone of a unit period of time on the chart is given a color having a certain density in accordance with the number (number/time) of visits of the small animal to each feed station. On this time chart, a color of a higher density is used to represent a larger number of visits of the small animal to the feed stations. It was ascertained from this time chart that the behavioral patterns of the normal mice A, B, C, and D were fitted to the feed station changing order of from 50a, 50b, 50c, to 50d with the lapse of time from the experiment starting time.

Figure 8:
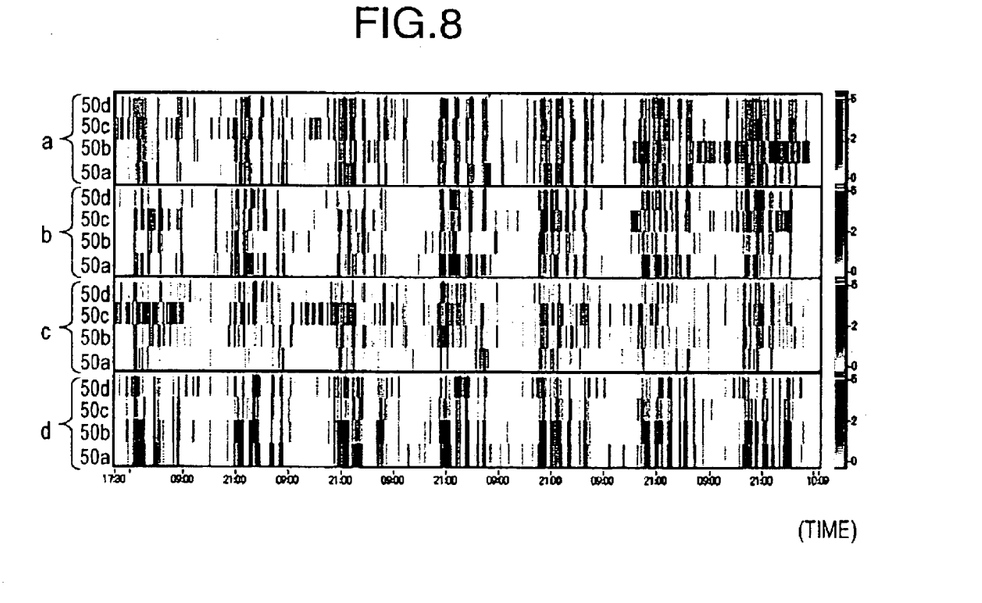
FIG. 8 is a time chart showing behavioral patterns of hippocampus-damaged mice outputted from the measuring system according to an embodiment of the present invention.

FIG. 8 is a time chart showing behavioral patterns of four hippocampus damaged mice A, B, C and D in a case where the feed available station is shifted in the order of from 50a, 50b, 50c, to 50d at unit time intervals. The lapse of time from the experiment starting time is expressed by the lateral axis, and each time zone of a unit period of time on the chart is given a color having a certain density in accordance with the number (number/time) of visits of the small animals to each feed station. On this time chart as well, a color of a higher density is used to represent a larger number of visits of the small animal to the feed stations. It was ascertained from this time chart that the behavioral patterns of the hippocampus damaged mice A, B, C and D were not fitted to the feed station changing order of from 50a, 50b, 50c, and 50d irrespective of the lapse of time from the experiment starting time.

Figure 9A:
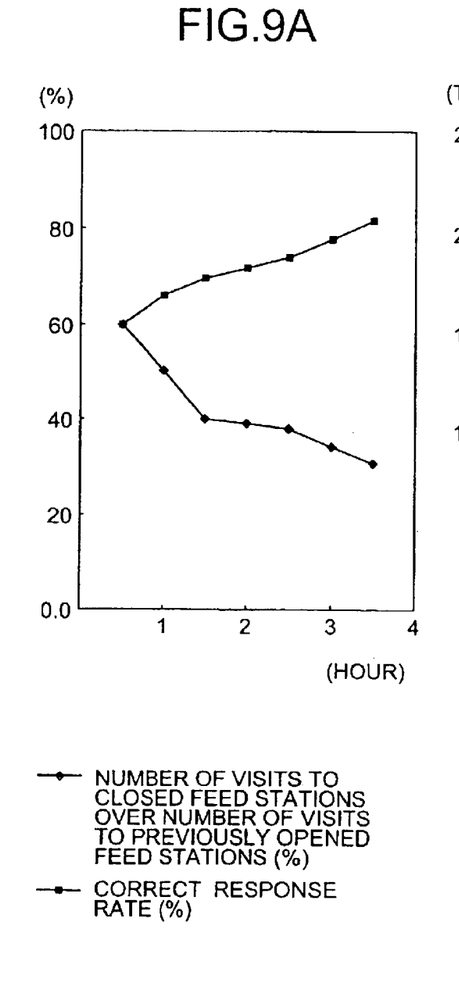
FIGS. 9A and 9B are two kinds of graphs, outputted from the measuring system, showing manners in which normal mice learn changes of feeding stations according to an embodiment of the present invention.
Figure 9B:
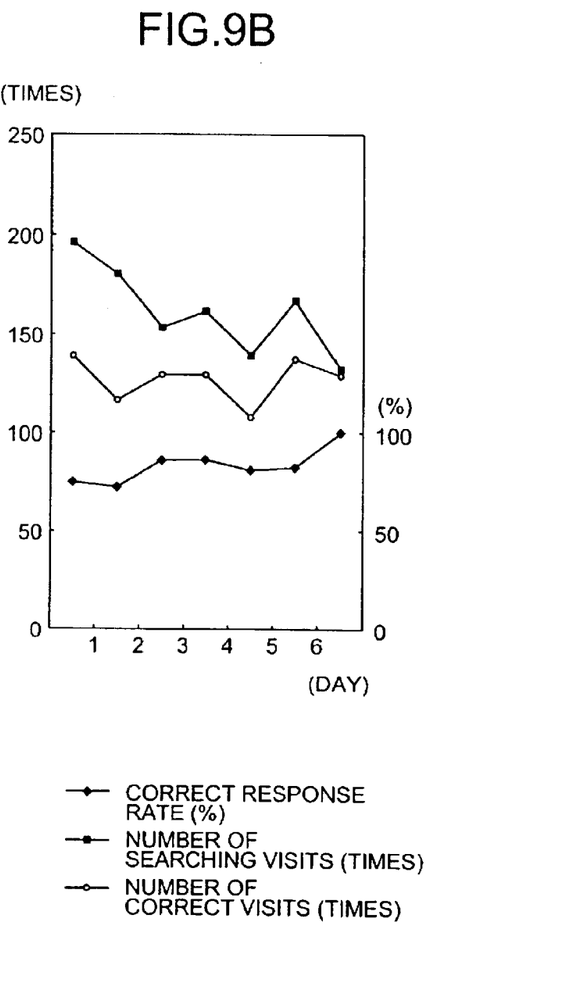

FIGS. 9A and 9B are two kinds of graphs showing learning process of four normal mice A, B, C, and D. FIG. 9B shows long-term learning effects of the four normal mice A, B, C, and D, while FIG. 9A shows short-term learning effects of the four normal mice A, B, C, D.

FIG. 9A in which the lapse of time from the experiment starting time is expressed by the lateral axis shows the transition of a correct response rate (%) 303, and that of a ratio (%) 304 of the number of visits of the mice to a feed station in which the ingestion of the feed was possible one (1) hour before to the number of visits of the mice to a feed station in which the ingestion of the feed is impossible. It was understood from this graph that the correct response rate increased with the lapse of time from the experiment starting time, and that the number of erroneous visits of the mice to a feed station in which the ingestion of the feed was possible 1 hour before decreased. This proved that the normal mice learned the feed station changing order in a short period of time.

FIG. 9B in which the lapse of time from the experiment starting date is taken along the lateral axis shows the transition of the number of visits (number of correct visits) 301 of the mice during one day to feed stations in which the ingestion of the feed is possible, and that of the number of visits (number of searching visits) 300 of the mice during one day to all the feed stations. The right-hand graph further shows the transition during one day of a correct response rate (number of correct visits/number of searching visits× 100%) 302. It was understood from this graph that the number of visits of the mice to each feed station for making a search for a feed station in which the ingestion of the feed was possible decreased with a correct response rate increased with the lapse of time from the experiment starting date. This proved that the normal mice learned the feed station changing order continuously for a long period of time, and that the learning effect improved steadily.

Although FIG. 7 and FIG. 8 show only the results of an analysis of the behavioral patterns of the mice concerning the ingestion of the feed, the behavioral patterns of the mice concerning the drinking of water are also analyzed in a similar manner. FIGS. 9A and 9B show only the results of an analysis of the learning patterns of normal mice concerning the ingestion of the feed, the learning patterns of normal mice concerning the drinking of water and the learning patterns of hippocampus damaged mice concerning the ingestion of the feed and drinking of water are also analyzed.

In the foregoing, when the measuring system according to one embodiment of the present invention is used, a computer controls supply of feed, water or the like to the small animal, thereby avoiding experimenter's contact to the small animal to as great an extent as possible. Then, it becomes possible to reduce stress the small animal receives. This can prevent dispersion (variations) in experiment results, depending on experimenters, and highly reliable experiment results can be obtained.

Further, all-the-time observation on the behaviors of the small animal by the-observation unit 80, as well as computer-controlled feed and water supply to the small animal, allow long-term continuation of experiments without any change of the experimental conditions. Furthermore, since the infrared ray detector is employed in the observation unit 80, the positions of the small animal can be determined both in the light period and in the dark period (both in the daytime and in the nighttime).

The present invention is not limited to the above-described modes of embodiment but various kinds of modifications can be made within the scope of the invention which does not depart from the spirits of the invention. For example, the memory and learning capabilities of the small animal concerning only the ingestion of the feed may be analyzed by the measuring system according to the present invention. In such a case, it is not necessary to provide the water supply unit 60 in the measuring unit 100. Conversely, the memory and learning capabilities of the small animal concerning only the drinking of water may be analyzed by the measuring system according to the present invention. In this case, it is not necessary to provide the feed stations 50a, 50b, 50c, and 50d in the measuring unit 100.

What is claimed is:

1. A method of measuring memory and learning capabilities of a small animal, comprising:

Measuring successively by an infrared ray detector a position of the small animal in an observation field, while a computer controls opening and closing of a plurality of covers, provided between the observation field holding the small animal therein and a feed holder storing feed therein, the opening and closing being conducted in a predetermined order each for predetermined time periods, and calculating by the computer the number of accessing times, of the small animal to respective through holes formed on the observation field, on the basis of an output from the infrared ray detector, each of said through holes being provided with an escape preventing net having a hole of a diameter smaller than a diameter of a skull of the small animal.

2. A method of measuring memory and learning capabilities of a small animal, comprising:

measuring a position of the small animal in an observation field successively by an infrared ray detector, while a computer controls opening and closing of a plurality of covers provided between the observation field holding the small animal therein and a feed holder storing feed therein, the opening and closing being conducted in a predetermined order for predetermined times, and the computer controls water supply through a plurality of nozzles inserted into the observation field holding the small animal therein, the control of water supply through each nozzle being conducted in a predetermined order for predetermined times, and calculating by the computer the number of accessing times, of the small animal to each nozzle and respective through holes formed on the observation field on the basis of an output from the infrared ray detector, each of said through holes being provided with an escape preventing net having a hole of a diameter smaller than a diameter of a skull of the small animal.

* * * * *